US008036464B2

(12) United States Patent
Sridhar et al.

(10) Patent No.: US 8,036,464 B2
(45) Date of Patent: Oct. 11, 2011

(54) SYSTEM AND METHOD FOR AUTOMATIC SEGMENTATION OF ASR TRANSCRIPTS

(75) Inventors: Varadarajan Sridhar, Bangalore (IN); Mohamed Abdul Karim Sadiq, Bangalore (IN); K. Kalyana Rao, Bangalore (IN)

(73) Assignee: Satyam Computer Services Limited, Secunderabad (IN)

( * ) Notice: Subject to any disclaimer, the term of this patent is extended or adjusted under 35 U.S.C. 154(b) by 1066 days.

(21) Appl. No.: 11/898,036

(22) Filed: Sep. 7, 2007

(65) Prior Publication Data
US 2009/0067719 A1 Mar. 12, 2009

(51) Int. Cl.
*G06K 9/34* (2006.01)
(52) U.S. Cl. ...................................................... 382/177
(58) Field of Classification Search .................. 382/177, 382/219, 309; 704/4, 9; 707/102, 760; 725/125
See application file for complete search history.

(56) References Cited

U.S. PATENT DOCUMENTS

| | | | | |
|---|---|---|---|---|
| 6,098,034 | A * | 8/2000 | Razin et al. ....................... | 704/9 |
| 7,092,567 | B2 * | 8/2006 | Ma et al. ....................... | 382/177 |
| 2002/0091713 | A1 * | 7/2002 | Walker ........................... | 707/200 |

OTHER PUBLICATIONS

"Lexter, a Natural Language Tool for Terminology Extraction" by Bourigault D., Gonzalez I., and Gros C. (appeared in Proceedings of the seventh EURALEX International Congress, Goteborg, Sweden, 1996).
"Word Association Norms, Mutual Information and Lexicography" by Church, K. and Hanks, P. (appeared in Computational Linguistics, vol. 16, No. 1, 1991).
"TextTiling: Segmenting Text into Multi-Paragraph Subtopic Passages" by Hearst, M. (appeared in Computational Linguistics, vol. 23, No. 1, 1997).
Query Expansion Using Local and Global Document Analysis by Xu J. and Croft W. B. (appeared in Proceedings of the Nineteenth Annual International ACM SIGIR Conference on Research and Development in Information Retrieval, 1996).
"Segmenting Conversations by Topic, Initiative, and Style" by Ries K. (appeared in Proceedings of ACM SIGIR'01 Workshop on Information Retrieval Techniques for Speech Applications, Louisiana, 2001).
"Automatic extraction of key sentences from oral presentations using statistical measure based on discourse markers" by Kitade T., Nanjo H., and Kawahara T. (appeared in Proceedings of International Conference on Spoken Language Processing (ICSLP), 2004).
"Domain-independent Text Segmentation Using Anisotropic Diffusion and Dynamic Programming" by Ji X. and Zha H. (appeared in Proceedings of the 26th Annual International ACM SIGIR Conference on Research and Development in Information Retrieval, 2003).
"Minimum Cut Model for Spoken Lecture Segmentation" by Malioutov I. and Barzilay R. (appeared in Proceedings of the 21 st International Conference on Computational Linguistics of the Association for Computational Linguistics, 2006).
"SeLeCT: A Lexical Cohesion Based News Story Segmentation System" by Stokes N., Carthy J., and Smeaton A. F. (appeared in Journal of AI Communications, vol. 17, No. 1, 2004).
"Text Segmentation by Topic" by Ponte J. M. and Croft W. B. (appeared in Proceedings of the First European Conference on Research and Advanced Technology for Digital Libraries, 1997).

* cited by examiner

*Primary Examiner* — Duy M Dang
(74) *Attorney, Agent, or Firm* — Merek, Blackmon & Voorhees, LLC (57) ABSTRACT

Text segmentation based on topic boundary detection has been an industry problem in automating information dissemination to targeted users. A system for automatic segmentation of ASR output text involves boundary identification based on "topic" changes. The proposed approach is based on building a weighted graph to determine dependency in input sentences based on bi-directional analysis of the input sentences. Furthermore, the input sentences are segmented based on the notion of segment cohesiveness and the segmented sentences are merged based on preamble and postamble analyses.

11 Claims, 10 Drawing Sheets

OVERVIEW OF TEXT SEGMENTATION

FIG. 1: OVERVIEW OF TEXT SEGMENTATION

MINEWORKERS' UNION ANNOUNCES END OF PROTEST. MINEWORKERS RETURN TO JOBS ON TUESDAY. NIPPON LIFE INSURANCE TO EXPAND. SOME 7,000 BLACK WORKERS RETURNED TO WORK AFTER STAGING ONE-DAY STRIKES AT TWO MINES ON MONDAY, THE NATIONAL UNION OF MINEWORKERS AND THE COMPANIES THAT OWN THE MINES SAID. ABOUT 6,000 MINERS RESUMED WORK AT THE GROOTVLEI GOLD MINE EAST OF JOHANNESBURG AFTER PROTESTING THE TRANSFER OF COLLEAGUES TO OTHER JOBS AT THE SAME MINE, OWNERS GENERAL MINING UNION CORP LTD SAID. THE UNION SAID ABOUT 1,000 MINEWORKERS AT A NEW COAL FACILITY OWNED BY ANGLO AMERICAN CORP OF SOUTH AFRICA LTD ALSO RETURNED TO THEIR JOBS ON TUESDAY. THE WORKERS AT ANGLO'S VAAL COLLIERY SOUTH OF JOHANNESBURG HAD STRUCK TO PROTEST THE ALLEGED REFUSAL OF OFFICIALS OF THE SOUTH AFRICAN HOMELAND OF TRANSKEI TO ALLOW MINERS TO ATTEND A FUNERAL IN THE HOMELAND, A UNION SPOKESMAN SAID. NIPPON LIFE INSURANCE CO IS PURSING A POSSIBLE LINK WITH AN AMERICAN SECURITIES HOUSE TO EXPAND ITS OVERSEAS INVESTMENT PORTFOLIO, A COMPANY SPOKESMAN SAID. BUT HE DECLINED TO COMMENT ON RUMOURS THE COMPANY WOULD TAKE A 10 PERCENT STAKE IN SHEARSON LEHMAN BROTHERS, AN INVESTMENT BANKING UNIT OF AMERICAN EXPRESS CO. HE SAID THE FIRM STARTED TO SOUND OUT SEVERAL U.S. INVESTMENT BANKS ON CAPITAL PARTICIPATION ABOUT 18 MONTHS AGO AND WAS NARROWING THE NUMBER OF PROSPECTS, BUT HE DID NOT SAY IF IT HAD SET ITS SIGHTS ON ONE FIRM. NIPPON LIFE, JAPAN'S LARGEST LIFE INSURER, ALSO PLANS TO SET UP A WHOLLY OWNED INVESTMENT UNIT, NISSEI INTERNATIONAL AMERICA, IN NEW YORK NEXT MONTH AND SUBSIDIARIES IN CANADA, SINGAPORE, THE CAYMAN ISLANDS AND JERSEY THIS YEAR, HE SAID. THESE MOVES ARE IN LINE WITH ITS LONG-TERM STRATEGY TO PUT MORE EMPHASIS ON OVERSEAS INVESTMENT MANAGEMENT AS OPPORTUNITIES AT HOME ARE DECLINING WHILE THE COMPANY'S ASSETS ARE GROWING. THE COMPANY IS ESPECIALLY ATTRACTED BY THE SCALE AND DEPTH OF U.S. MONEY AND CREDIT MARKETS AND WANTS TO ESTABLISH A FIRM FOOTHOLD THERE, THE SPOKESMAN ADDED. WEST GERMAN CAR AND VAN PRODUCTION ROSE TO 389,900 IN FEBRUARY FROM 380,900 IN FEBRUARY 1986, THE GERMAN AUTOMOBILE INDUSTRY ASSOCIATION VDA SAID IN A STATEMENT. PRODUCTION OF TRUCKS OF UP TO SIX TONNES FELL SHARPLY TO 11,500 FROM 14,600, OWING TO A CUT IN PRODUCTION OF SMALL DELIVERY VANS OF UP TO TWO TONNES. TOTAL VEHICLE OUTPUT ROSE TO 410,000 FROM 404,600. CAR AND VAN EXPORTS EASED TO 222,000 IN FEBRUARY FROM 225,000 ONE YEAR EARLIER, AND EXPORTS OF TRUCKS OF UP TO SIX TONNES DROPPED TO 6,200 FROM 9,900. TOTAL VEHICLE EXPORTS FELL TO 233,200 FROM 240,300. CAR AND VAN OUTPUT IN JANUARY AND FEBRUARY EASED TO 758,700 FROM 766,500 IN THE FIRST TWO MONTHS OF 1986. PRODUCTION OF TRUCKS UP TO SIX TONNES FELL TO 26,300 FROM 30,700, AND TOTAL VEHICLE PRODUCTION FELL TO 802,300 FROM 814,900. CAR AND VAN EXPORTS IN JANUARY AND FEBRUARY FELL TO 424,700 FROM 443,300 A YEAR EARLIER AND EXPORTS OF TRUCKS UP TO SIX TONNES FELL TO 15,400 FROM 20,200. TOTAL VEHICLE EXPORTS FELL TO 449,200 FROM 473,500. MINEWORKERS CALL-OFF STRIKES, RESUME WORK. WEST GERMAN CAR AND VAN PRODUCTION ROSE, TRUCK PRODUCTION FELL. TOTAL VEHICLE EXPORTS FELL.

FIG. 2: AN ILLUSTRATIVE INPUT

| | TOKENS | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|---|
| 1 | AFRICA | | | | | | 1 | 1 | | | | | | | | | | | | | | | | | | |
| 3 | AMERICA | | | | | | 1 | | 1 | 1 | | 1 | | | | | | | | | | | | | | |
| 4 | ANGLO | | | | | | 1 | 1 | | | | | | | | | | | | | | | | | | |
| 5 | ANNOUNCE | 1 | | | | | | | | | | | | | | | | | | | | | | | | |
| 10 | AUTOMOBILE | | | | | | | | | | | | | | | 1 | | | | | | | | | | |
| 11 | BANK | | | | | | | | 1 | 1 | | | | | | | | | | | | | | | | |
| 14 | CALL-OFF | | | | | | | | | | | | | | | | | | | | | | 1 | | | |
| 17 | CAR | | | | | | | | | | | | | | | 1 | | 1 | | 1 | | 1 | | | 1 | |
| 20 | COLLEAGUES | | | | | 2 | | | | | | | | | | | | | | | | | | | | |
| 23 | COMPANY | | | | 1 | | | | 1 | 1 | | | 1 | 1 | | | | | | | | | | | | |
| 24 | CORP | | | | | 1 | 1 | | | | | | | | | | | | | | | | | | | |
| 27 | DECLINE | | | | | | | | 1 | | | | 1 | | | | | | | | | | | | | |
| 31 | EARLIER | | | | | | | | | | | | | | | | | | 1 | | | 1 | | | | |
| 32 | EASE | | | | | | | | | | | | | | | | | | 1 | 1 | | | | | | |
| 37 | EXPAND | | | 1 | | | | | 1 | | | | | | | | | | | | | | | | | |
| 38 | EXPORT | | | | | | | | | | | | | | | | | | 1 | 1 | | 1 | 1 | | | 1 |
| 41 | FEBRUARY | | | | | | | | | | | | | | | 1 | | | 1 | | 1 | 1 | | | | |
| 42 | FELL | | | | | | | | | | | | | | | | 1 | | | 1 | | 1 | 1 | 1 | 1 | 1 |
| 43 | FIRM | | | | | | | | 1 | | | | | 1 | | | | | | | | | | | | |
| 52 | HOMELAND | | | | | | | 2 | | | | | | | | | | | | | | | | | | |
| 55 | INSURANCE | | | 1 | | | | | 1 | | | 1 | | | | | | | | | | | | | | |
| 57 | INVESTMENT | | | | | | | | 1 | 1 | 1 | 1 | 1 | | | | | | | | | | | | | |
| 59 | JANUARY | | | | | | | | | | | | | | | | | | | 1 | | 1 | | | | |
| 62 | JOB | | 1 | | | 1 | 1 | | | | | | | | | | | | | | | | | | | |
| 63 | JOHANNESBURG | | | | | 1 | | 1 | | | | | | | | | | | | | | | | | | |
| 66 | LIFE | | | 1 | | | | 1 | | | 2 | | | | | | | | | | | | | | | |
| 67 | LINE | | | | | | | | | | | | | 1 | | | | | | | | | | | | |
| 72 | MINER | | | | | 1 | 1 | | | | | | | | | | | | | | | | | | | |
| 73 | MINE | | | | 1 | 2 | | | | | | | | | | | | | | | | | | | | |
| 74 | MINEWORKER | 1 | 1 | | 1 | | 1 | | | | | | | | | | | | | | | | | | 1 | |
| 82 | NIPPON | | | 1 | | | | 1 | | 1 | | | | | | | | | | | | | | | | |
| 97 | PRODUCTION | | | | | | | | | | | | | | | 1 | 2 | | | | 2 | | | | 2 | |
| 99 | PROTEST | 1 | | | | 1 | 1 | | | | | | | | | | | | | | | | | | | |
| 104 | RETURN | | 1 | | 1 | 1 | | | | | | | | | | | | | | | | | | | | |
| 105 | ROSE | | | | | | | | | | | | | | | | 1 | 1 | | | | | | | 1 | |
| 116 | SOUTH | | | | | | 1 | 2 | | | | | | | | | | | | | | | | | | |
| 117 | SPOKESMAN | | | | | | 1 | 1 | | | | | 1 | | | | | | | | | | | | | |
| 126 | TONNES | | | | | | | | | | | | | | | | 2 | | 1 | | | 1 | 1 | | | |
| 127 | TOTAL | | | | | | | | | | | | | | | | | 1 | | 1 | | 1 | | 1 | | 1 |
| 128 | TRANSFER | | | | 1 | | | | | | | | | | | | | | | | | | | | | |
| 129 | TRANSKEI | | | | | | | 1 | | | | | | | | | | | | | | | | | | |
| 130 | TRUCK | | | | | | | | | | | | | | | | | 1 | | 1 | | 1 | 1 | | 1 | |
| 131 | TUESDAY | | 1 | | | | 1 | | | | | | | | | | | | | | | | | | | |
| 132 | UNION | 1 | | | 1 | 1 | 1 | 1 | | | | | | | | | | | | | | | | | | |
| 133 | UNIT | | | | | | | | 1 | | | 1 | | | | | | | | | | | | | | |
| 136 | VAN | | | | | | | | | | | | | | | 1 | 1 | | 1 | | 1 | | 1 | | | |
| 138 | VEHICLE | | | | | | | | | | | | | | | | 1 | | 1 | | 1 | | 1 | | | 1 |
| 143 | YEAR | | | | | | | | | | 1 | | | | | | | 1 | | | 1 | | | | | |
| 144 | YORK | | | | | | | | | | 1 | | | | | | | | | | | | | | | |
| 144 | SUM: N[I] | 5 | 4 | 4 | 14 | 19 | 13 | 21 | 14 | 14 | 14 | 24 | 15 | 12 | 12 | 12 | 4 | 10 | 4 | 7 | 7 | 10 | 4 | 5 | 9 | 4 |

FIG. 3: AN ILLUSTRATIVE FREQUENCY MATRIX

```
TEXTDEPENDENCYGENERATION
// INPUT: FREQUENCY MATRIX (M SENTENCES, N TOKENS) FM(M,N)
// OUTPUT: GRAPH (M VERTICES, E EDGES) G(V,E)

FOR EACH SENTENCE I // SENTENCE MAPPING
  V VERTICES: REPRESENT SEQUENCE OF SENTENCES 1 TO M IN THE ORDER THEY APPEAR
    IN THE INPUT
  T[I]: NUMBER OF TOKENS IN SENTENCE I
ENDFOR   // SENTENCE MAPPING

MIN = LOG(M/(M-1)) / MAXIMUM(TI)
MAX = LOG(M) / MINIMUM(TI)

FOR EACH VERTEX I = 1 TO M  // SENTENCE ANALYSIS
  FOR EACH TOKEN K IN SENTENCE I  // TOKEN ANALYSIS
    IF (I < M)
        FOR VERTEX J = I+1 TO M        // RIGHT NEIGHBORHOOD ANALYSIS
            IF ( FM[J,K] )       // CO-OCCURRENCE OF TOKEN K IN SENTENCES I AND J
                FI,J += FM[I,K] * LOG (M/(J-I)) / T[I];
        ENDFOR         // RIGHT NEIGHBORHOOD ANALYSIS
      ELSE FI,J = 0;
    IF ( I > 1 )
        FOR VERTEX J = 1 TO I-1        // LEFT NEIGHBORHOOD ANALYSIS
            IF ( FM[J,K] )
                RI,J += FM[I,K] * LOG (M/(I-J)) / T[I];
        ENDFOR         // LEFT NEIGHBORHOOD ANALYSIS
      ELSE RI,J = 0;
  ENDFOR         // TOKEN ANALYSIS
ENDFOR         // SENTENCE ANALYSIS
FOR I = 1 TO M
  FOR J = 1 TO M
    E[I,J] = (FI,J + RI,J)/(2*(MAX - MIN));   // E[I,J] IS THE COMPUTED EDGE WEIGHT
RETURN (G:V,E);       // GRAPH REPRESENTATION OF INPUT TEXT
```

FIG. 4: DEPENDENCY GRAPH GENERATION

FIG. 5: AN ILLUSTRATIVE DEPENDENCY GRAPH

```
TextSegmentation
// Input: G(V,E)
// Output: OutGraphSet        // Disjoint subgraphs Put G into InGraphSet;
WhileBegin1: While InGraphSet is not empty
{
  Select and remove a graph G'(V',E') from InGraphSet;
  If (Cohesiveness(G') >= Threshold) //Typically, Threshold is about 0.5
  { Put G' into OutGraphSet; GoTo WhileBegin1}
  Initialize D;
  WhileBegin2: While (TRUE)
    { Pick edge e from E' with minimum weight and put into D;
      If G' can be partitioned by cutting a subset of edges from D
      { Put the partitions of G' to InGraphSet; Quit WhileBegin2 loop}
    }
}
```

FIG. 6: GRAPH SEGMENTATION BASED ON COHESIVENESS 600

```
SEGMENTCOHESIVENESS
// INPUT: G(V,E) SEGMENT WITH M VERTICES WITH NORMALIZED EDGE WEIGHTS
// OUTOUT: COHESIVENESS MEASURE

TOTALWEIGHT = SUM OF EDGE WEIGHTS OF G
TOTALSUM = 0;
FOR EACH VERTEX I FROM 1 TO M-1
{ ROWSUM = 0;
  FOR EACH VERTEX J FROM I+1 TO M
    ROWSUM += SUM OF EDGE WEIGHTS OF WEIGHTEDSHORTESTPATH(I,J)
        // OVERALL WEIGHT OF WEIGHTED SHORTEST PATH FROM VERTEX I TO J;
  TOTALSUM += ROWSUM / TOTALWEIGHT;
}
COHESIVENESS = TOTALSUM / M;
RETURN COHESIVENESS
```

620

FIG. 6A: SEGMENT COHESIVENESS

```
TextMerging
// Input: InGraphSet   // Ordered set of text segments
// Output PreGraphs and PostGraphs // Set of text segments
// Output: OutGraphSet  // Merged text segments //Preamble Identification
Get first graph G from InGraphSet; nPrev = 0;
While (TRUE)
{
  If G is NULL Break While loop;
  Let nCurr be the number of sentences in G;
  If |nCurr - nPrev| <= Threshold // Typically, Threshold is about 2
    { nPrev = nCurr;  Put G to PreGraphs;} Else Break While loop;
  Get next graph G from InGraphSet;
}

//Postamble Identification
Get last graph G from InGraphSet; nPrev = 0;
While (TRUE)
{
  If G is NULL Break While loop;
  Let nCurr be the number of sentences in G;
  If |nCurr - nPrev| <= Threshold // Typicall, Threshold is about 2
    { nPrev = nCurr;  Put G to PostGraphs;} Else Break While loop;
  Get previous graph G from InGraphSet;
}

Remove PreGraphs and PostGraphs from InGraphSet and make OutGraphSet;

//Spatial merging
For each G in PreGraphs
{
  Identify G1 from OutGraphSet such that sum of frequency counts of sentences
    associated with G and G1 with respect to FrequencyMatrix is maximum;
    If there are several maximums, identify all of them;
  Merge G with each such G1s;
}
For each G in PostGraphs
{
  Identify G2 from OutGraphSet such that sum of frequency counts of sentences
    associated with G and G2 with respect to FrequencyMatrix is maximum;
    If there are several maximums, identify all of them;
  Merget G with each such G2s;
}
```

FIG. 6B: GRAPH MERGING

FIG. 7: AN ILLUSTRATIVE GRAPH SEGNMENTS

Header Segments:
Segment H1:
1. Mineworkers' union announces end of protest.
2. Mineworkers return to jobs on Tuesday.
Segment H2:
3. Nippon Life Insurance to expand.

Main Segments:
Segment A:
4. Some 7,000 black workers returned to work after staging one-day strikes at two mines on Monday, the National Union of Mineworkers and the companies that own the mines said.
5. About 6,000 miners resumed work at the Grootvlei gold mine east of Johannesburg after protesting the transfer of colleagues to other jobs at the same mine, owners General Mining Union Corp Ltd said.
6. The union said about 1,000 mineworkers at a new coal facility owned by Anglo American Corp of South Africa Ltd also returned to their jobs on Tuesday.
7. The workers at Anglo's Vaal Colliery south of Johannesburg had struck to protest the alleged refusal of officials of the South African homeland of Transkei to allow miners to attend a funeral in the homeland, a union spokesman said.
Segment B:
8. Nippon Life Insurance Co is pursing a possible link with an American securities house to expand its overseas investment portfolio, a company spokesman said.
9. But he declined to comment on rumours the company would take a 10 percent stake in Shearson Lehman Brothers, an investment banking unit of American Express Co.
7. He said the firm started to sound out several U.S. Investment banks on capital participation about 10 months ago and was narrowing the number of prospects, but he did not say if it had set its sights on one firm.
11. Nippon Life, Japan's largest life insurer, also plans to set up a wholly owned investment unit, Nissei International America, in New York next month and subsidiaries in Canada, Singapore, the Cayman Islands and Jersey this year, he said.
12. These moves are in line with its long-term strategy to put more emphasis on overseas investment management as opportunities at home are declining while the company's assets are growing.
13. The company is especially attracted by the scale and depth of U.S. Money and credit markets and wants to establish a firm foothold there, the spokesman added.
Segment C:
14. West German car and van production rose to 389,900 in February from 380,900 in February 1986, the German Automobile Industry Association VDA said in a statement.
15. Production of trucks of up to six tonnes fell sharply to 11,500 from 14,600, owing to a cut in production of small delivery vans of up to two tonnes.
16. Total vehicle output rose to 410,000 from 404,600.
17. Car and van exports eased to 222,000 in February from 225,000 one year earlier, and exports of trucks of up to six tonnes dropped to 6,200 from 9,900.
18. Total vehicle exports fell to 233,200 from 240,300.
19. Car and van output in January and February eased to 758,700 from 766,500 in the first two months of 1986.
20. Production of trucks up to six tonnes fell to 26,300 from 30,700, and total vehicle production fell to 802,300 from 814,900.
21. Car and van exports in January and February fell to 424,700 from 443,300 a year earlier and exports of trucks up to six tonnes fell to 15,400 from 20,200.
22. Total vehicle exports fell to 449,200 from 473,500.

Footer Segments:
Segment F1:
23. Mineworkers call-off strikes, resume work.
Segment F2:
24. West German car and van production rose, truck production fell.
25. Total vehicle exports fell.

FIG. 8: AN ILLUSTRATIVE TEXT SEGMENTS

SEGMENTS
SEGMENT A:
1. MINEWORKERS' UNION ANNOUNCES END OF PROTEST.
2. MINEWORKERS RETURN TO JOBS ON TUESDAY.
4. SOME 7,000 BLACK WORKERS RETURNED TO WORK AFTER STAGING ONE-DAY STRIKES AT TWO MINES ON MONDAY, THE NATIONAL UNION OF MINEWORKERS AND THE COMPANIES THAT OWN THE MINES SAID.
5. ABOUT 6,000 MINERS RESUMED WORK AT THE GROOTVLEI GOLD MINE EAST OF JOHANNESBURG AFTER PROTESTING THE TRANSFER OF COLLEAGUES TO OTHER JOBS AT THE SAME MINE, OWNERS GENERAL MINING UNION CORP LTD SAID.
6. THE UNION SAID ABOUT 1,000 MINEWORKERS AT A NEW COAL FACILITY OWNED BY ANGLO AMERICAN CORP OF SOUTH AFRICA LTD ALSO RETURNED TO THEIR JOBS ON TUESDAY.
7. THE WORKERS AT ANGLO'S VAAL COLLIERY SOUTH OF JOHANNESBURG HAD STRUCK TO PROTEST THE ALLEGED REFUSAL OF OFFICIALS OF THE SOUTH AFRICAN HOMELAND OF TRANSKEI TO ALLOW MINERS TO ATTEND A FUNERAL IN THE HOMELAND, A UNION SPOKESMAN SAID.
23. MINEWORKERS CALL-OFF STRIKES, RESUME WORK.
SEGMENT B:
3. NIPPON LIFE INSURANCE TO EXPAND
8. NIPPON LIFE INSURANCE CO IS PURSING A POSSIBLE LINK WITH AN AMERICAN SECURITIES HOUSE TO EXPAND ITS OVERSEAS INVESTMENT PORTFOLIO, A COMPANY SPOKESMAN SAID.
9. BUT HE DECLINED TO COMMENT ON RUMOURS THE COMPANY WOULD TAKE A 10 PERCENT STAKE IN SHEARSON LEHMAN BROTHERS, AN INVESTMENT BANKING UNIT OF AMERICAN EXPRESS CO.
7. HE SAID THE FIRM STARTED TO SOUND OUT SEVERAL U.S. INVESTMENT BANKS ON CAPITAL PARTICIPATION ABOUT 10 MONTHS AGO AND WAS NARROWING THE NUMBER OF PROSPECTS, BUT HE DID NOT SAY IF IT HAD SET ITS SIGHTS ON ONE FIRM.
11. NIPPON LIFE, JAPAN'S LARGEST LIFE INSURER, ALSO PLANS TO SET UP A WHOLLY OWNED INVESTMENT UNIT, NISSEI INTERNATIONAL AMERICA, IN NEW YORK NEXT MONTH AND SUBSIDIARIES IN CANADA, SINGAPORE, THE CAYMAN ISLANDS AND JERSEY THIS YEAR, HE SAID.
12. THESE MOVES ARE IN LINE WITH ITS LONG-TERM STRATEGY TO PUT MORE EMPHASIS ON OVERSEAS INVESTMENT MANAGEMENT AS OPPORTUNITIES AT HOME ARE DECLINING WHILE THE COMPANY'S ASSETS ARE GROWING.
13. THE COMPANY IS ESPECIALLY ATTRACTED BY THE SCALE AND DEPTH OF U.S. MONEY AND CREDIT MARKETS AND WANTS TO ESTABLISH A FIRM FOOTHOLD THERE, THE SPOKESMAN ADDED.
SEGMENT C:
14. WEST GERMAN CAR AND VAN PRODUCTION ROSE TO 389,900 IN FEBRUARY FROM 380,900 IN FEBRUARY 1986, THE GERMAN AUTOMOBILE INDUSTRY ASSOCIATION VDA SAID IN A STATEMENT.
15. PRODUCTION OF TRUCKS OF UP TO SIX TONNES FELL SHARPLY TO 11,500 FROM 14,600, OWING TO A CUT IN PRODUCTION OF SMALL DELIVERY VANS OF UP TO TWO TONNES.
16. TOTAL VEHICLE OUTPUT ROSE TO 410,000 FROM 404,600.
17. CAR AND VAN EXPORTS EASED TO 222,000 IN FEBRUARY FROM 225,000 ONE YEAR EARLIER, AND EXPORTS OF TRUCKS OF UP TO SIX TONNES DROPPED TO 6,200 FROM 9,900.
18. TOTAL VEHICLE EXPORTS FELL TO 233,200 FROM 240,300.
19. CAR AND VAN OUTPUT IN JANUARY AND FEBRUARY EASED TO 758,700 FROM 766,500 IN THE FIRST TWO MONTHS OF 1986.
20. PRODUCTION OF TRUCKS UP TO SIX TONNES FELL TO 26,300 FROM 30,700, AND TOTAL VEHICLE PRODUCTION FELL TO 802,300 FROM 814,900.
21. CAR AND VAN EXPORTS IN JANUARY AND FEBRUARY FELL TO 424,700 FROM 443,300 A YEAR EARLIER AND EXPORTS OF TRUCKS UP TO SIX TONNES FELL TO 15,400 FROM 20,200.
22. TOTAL VEHICLE EXPORTS FELL TO 449,200 FROM 473,500.
24. WEST GERMAN CAR AND VAN PRODUCTION ROSE, TRUCK PRODUCTION FELL.
25. TOTAL VEHICLE EXPORTS FELL.

FIG. 9: AN ILLUSTRATIVE MERGED TEXT SEGMENTS

SYSTEM AND METHOD FOR AUTOMATIC SEGMENTATION OF ASR TRANSCRIPTS

FIELD OF THE INVENTION

The present invention relates to text analysis in general, and more particularly, text analysis of automated speech recognizer outputs. Still more particularly, the present invention related to a system and method for analyzing input text to determine a dependency graph based on bidirectional analysis and to segment and merge input text based on the determined dependency graph.

BACKGROUND OF THE INVENTION

Identification of coherent sections of sentences is a form of text segmentation Processing of output from an automatic speech recognition (ASR) system is a widely applicable scenario for such text segmentation. In a variety of applicable scenarios, the plain text does not contain any title or annotation to hint about the subtopics discussed. Further, there is a need to segment ASR transcripts to determine a group of sentences wherein such a group need not have to have temporal cohesiveness. Text segmentation has been widely applied in topic identification, text summarization, categorization, information retrieval and dissemination.

Consider a scenario of broadcast news packaging for registered users. The users' profile provides information about the kind of news packages that need to be delivered to the various users. As news is broadcast, it is required to analyze the generated ASR transcripts, identify news segments, and combine multiple segments as a package of audio and video for delivery. Another scenario of interest is scene based segmentation of a video. While it is interesting to determine scenes based on video analysis, it is not completely error-free. In order to complement such an approach, it is useful to analyze the associated audio and convert the same to text form using an ASR system, and the segmentation of the generated text could assist in scene segmentation.

DESCRIPTION OF RELATED ART

U.S. Pat. No. 6,928,407 to Ponceleon; Dulce Beatriz (Palo Alto, Calif.), Srinivasan; Savitha (San Jose, Calif.) for "System and method for the automatic discovery of salient segments in speech transcripts" (issued on Aug. 9, 2005 and assigned to International Business Machines Corporation (Armonk, N.Y.)) describes a system and associated method to automatically discover salient segments in a speech transcript and focus on the segmentation of an audio/video source into topically cohesive segments based on Automatic Speech Recognition (ASR) transcriptions using the word n-grams extracted from the speech transcript.

U.S. Pat. No. 6,772,120 to Moreno; Pedro J. (Cambridge, Mass.), Blei; David M. (Oakland, Calif.) for "Computer method and apparatus for segmenting text streams" (issued on Aug. 3, 2004 and assigned to Hewlett-Packard Development Company, L.P. (Houston, Tex.)) describes a computer method and apparatus for segmenting text streams based on computed probabilities associated with a group of words with respect to a topic selected from a set of predetermined topics.

U.S. Pat. No. 6,529,902 to Kanevsky; Dimitri (Ossining, N.Y.), Yashchm; Emmanuel (Yorktown Heights, N.Y.) for "Method and system for off-line detection of textual topical changes and topic identification via likelihood based methods for improved language modeling" (issued on Mar. 4, 2003 and assigned to International Business Machines Corporation (Armonk, N.Y.)) describes a system (and method) for off-line detection of textual topical changes that includes at least one central processing unit (CPU), at least one memory coupled to the at least one CPU, a network connectable to the at least one CPU, and a database, stored on the at least one memory, containing a plurality of textual data set of topics. The CPU executes first and second processes in first and second directions, respectively, for extracting a segment having a predetermined size from a text, computing likelihood scores of a text in the segment for each topic, computing likelihood ratios, comparing them to a threshold, and defining whether there is a change point at the current last word in a window.

U.S. Pat. No. 6,104,989 to Kanevsky; Dimitri (Ossining, N.Y.), Yashchm; Emmanuel (Yorktown Heights, N.Y.) for "Real time detection of topical changes and topic identification via likelihood based methods" (issued on Aug. 15, 2000 and assigned to International Business Machines Corporation (Armonk, N.Y.)) describes a method for detecting topical changes and topic identification in texts in real time using likelihood ratio based methods.

"LEXTER, a Natural Language Tool for Terminology Extraction" by Bourigault D., Gonzalez I., and Gros C. (appeared in Proceedings of the seventh EURALEX International Congress, Goteborg, Sweden, 1996), describes the use of natural language processing to extract phrases by means of syntactical structures.

"Word Association Norms, Mutual Information and Lexicography" by Church, K. and Hanks, P. (appeared in Computational Linguistics, Volume 16, Number 1, 1991), describes the use of statistical occurrence measures for the purposes of phrase extraction.

"TextTiling: Segmenting Text into Multi-Paragraph Subtopic Passages" by Hearst, M. (appeared in Computational Linguistics, Volume 23, Number 1, 1997), "Advances in Domain Independent Linear Text Segmentation" by Choi F. (appeared in Proceedings of the North American Chapter of ACL, 2000), "SeLeCT: A Lexical Cohesion Based News Story Segmentation System" by Stokes N., Carthy J., and Smeaton A. F. (appeared in Journal of AI Communications, Volume 17, Number 1, 2004) describe the methodologies based on linguistic techniques such as lexical cohesion for text segmentation.

"Query Expansion Using Local and Global Document Analysis" by Xu J. and Croft W. B. (appeared in Proceedings of the Nineteenth Annual International ACM SIGIR Conference on Research and Development in Information Retrieval, 1996), and "Text Segmentation by Topic" by Ponte J. M. and Croft W. B. (appeared in Proceedings of the First European Conference on Research and Advanced Technology for Digital Libraries, 1997) describe the approaches based on local context analysis.

"Segmenting Conversations by Topic, Initiative, and Style" by Ries K. (appeared in Proceedings of ACM SIGIR'01 Workshop on Information Retrieval Techniques for Speech Applications, Louisiana, 2001) describes the segmentation of speech recognizer transcripts based on speaker initiative and style to achieve topical segmentation.

"Automatic extraction of key sentences from oral presentations using statistical measure based on discourse markers" by Kitade T., Nanjo H., and Kawahara T. (appeared in Proceedings of International Conference on Spoken Language Processing (ICSLP), 2004) describes the use of discourse markers at the beginning of sections in presentations for detecting section boundaries.

"Domain-independent Text Segmentation Using Anisotropic Diffusion and Dynamic Programming" by Ji X. and Zha H. (appeared in Proceedings of the 26th Annual International ACM SIGIR Conference on Research and Development in Information Retrieval, 2003) describes a domain-independent text segmentation method that identifies the boundaries of topic changes in long text documents and/or text streams based on anisotropic diffusion technique applied to an image representation of sentence-distance matrix.

"Minimum Cut Model for Spoken Lecture Segmentation" by Malioutov I. and Barzilay R. (appeared in Proceedings of the 21st International Conference on Computational Linguistics of the Association for Computational Linguistics, 2006) describes the task of unsupervised lecture segmentation and applies graph partitioning to identify topic sentences. The similarity computation presented is based on exponential cosine similarity.

The known systems do not address the various issues related to text segmentation including the dependence on lexicon for enforcing syntactic and semantic structures, determining of inter-sentence relationship based on bi-directional (forward and reverse) analysis, assessing of segment cohesiveness, and merging of related segments. The present invention provides a system for addressing these issues in order to achieve more effective text segmentation.

SUMMARY OF THE INVENTION

The primary objective of the invention is to determine a plurality of sentence segments given an input text of plurality of sentences.

One aspect of the present invention is to determine a weighted graph based on bi-directional analysis of a plurality of sentences.

Another aspect of the present invention is to determine cohesiveness of a sentence segment.

Yet another aspect of present invention is to determine a plurality of sentence segments based on segment cohesiveness.

Another aspect of the present invention is to determine a plurality of preamble segments given a plurality of sentence segments.

Yet another aspect of the present is to determine a plurality of postamble segments given a plurality of sentence segments.

Another aspect of the invention is to merge a preamble segment with a sentence segment of a plurality of sentence segments.

Yet another aspect of the invention is to merge a postamble segment with a sentence segment of a plurality of sentence segments.

BRIEF DESCRIPTION OF THE DRAWINGS

FIG. 2 depicts an illustrative input text.
FIG. 8 depicts an illustrative text segments.
FIG. 9 depicts an illustrative merged text segments.

DETAILED DESCRIPTION OF THE PREFERRED EMBODIMENTS

Text segmentation has been widely applied in topic identification, text summarization, categorization, information retrieval and dissemination. The plain text under consideration does not contain any title or annotation to hint about the subtopics discussed. It is assumed that sentences of the plain text are separated by periods; however there are no paragraph demarcations. Each sentence needs to be parsed, in an iterative manner, to check if some incoherence exists between sentences. Continuity of a topic, discussed in consecutive sentences, can be identified by means of certain frequency measures of the constituent words across the sentences. The task is analogous to shot detection in video.

Figure 1:
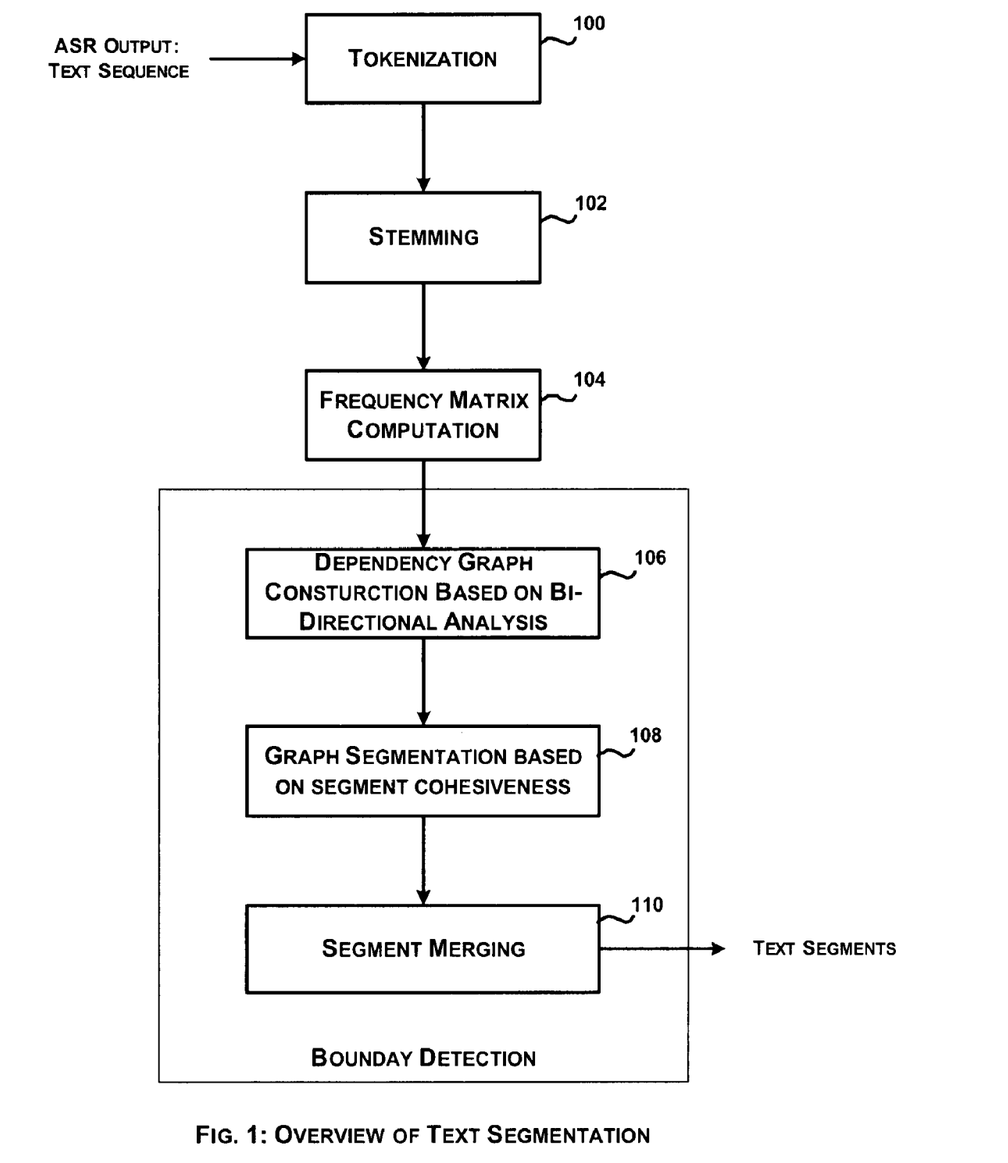
FIG. 1 depicts an overview of text segmentation system.

FIG. 1 depicts an overview of text segmentation system. The main objective of the present invention is to analyze an input text to divide the same into a cohesive text segments. It further envisaged to achieve this objective without a lexicon providing information about syntactic and semantic substructures. The text under consideration is a set of sentences. An important first step is tokenization (100). In the tokenization phase, the input sentences are decomposed into tokens that are either words or atomic terms. The noise words are filtered out based on a list of stop-words. This list is customized to exclude pronoun related words. The second step is related to stemming (102). In order to eliminate duplicate words, stemming is performed resulting in the root words. Gramming is done to correct spelling mistakes or errors due to speech-to-text conversion. This is performed by evaluating trigrams or sets of three consecutive characters. The third step is to build Frequency Matrix (104). The Frequency Matrix consists of the frequencies of tokens in different sentences. The sequence of sentences is maintained in the same order as they occur in the given text. The tokens are clubbed together based on the (syntactic) relationship of words.

Boundary detection involves in constructing graph representation (106) of a given set of sentences with edge weights that depict syntactic and semantic relationship among sentences. And the dependency graph is analyzed and segmented (108) based on temporal characteristics and where appropriate, the identified segments are grouped (110) based on spatial characteristics.

FIG. 2 depicts an illustrative input text. Note that input text is a general news related text and is based on the text available at the site: "http://kdd.ics.uci.edu/databases/reuters21578/reuters21578.html". The sentences in the input text are demarcated by a period.

Figure 3:
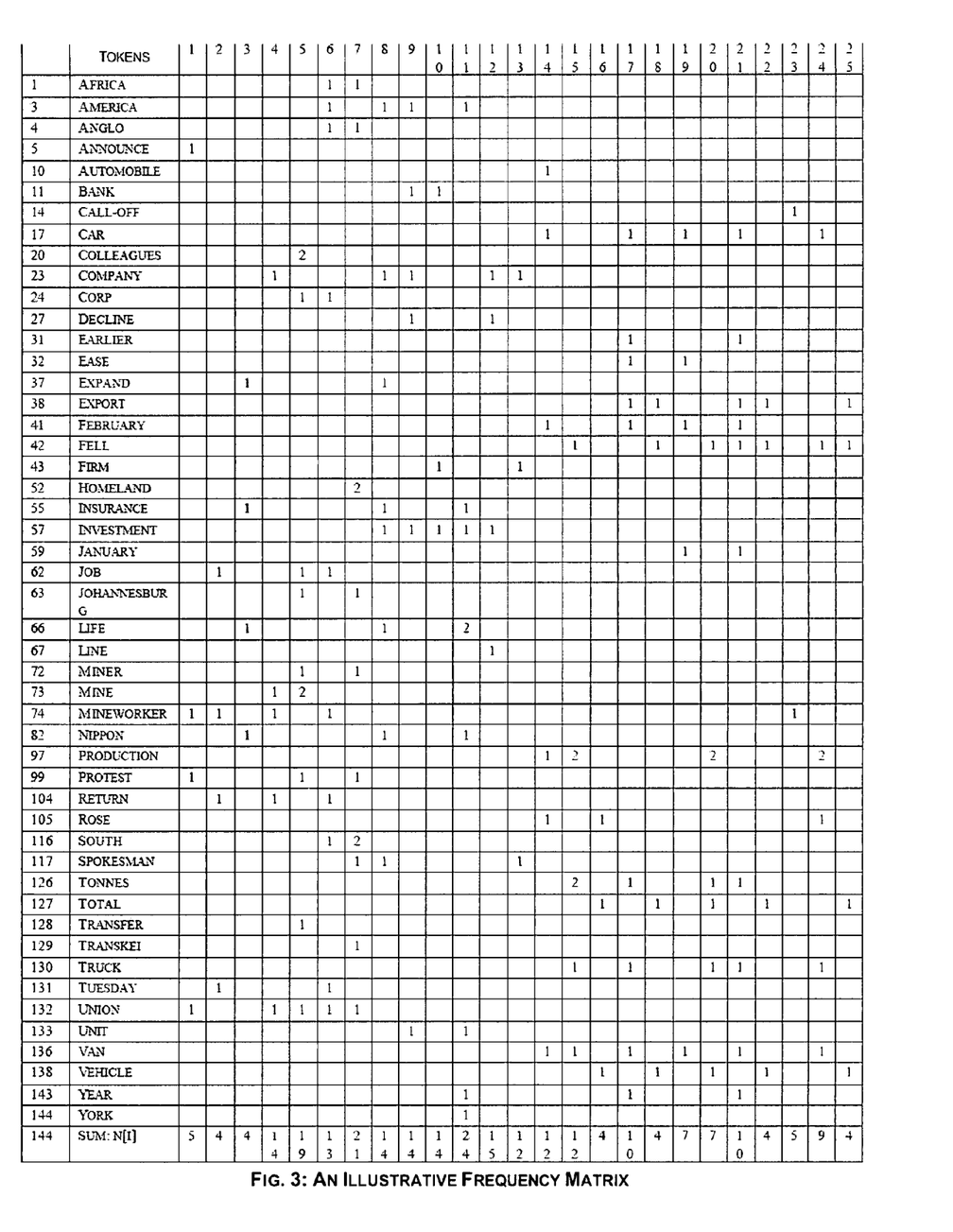
FIG. 3 depicts an illustrative frequency matrix.

FIG. 3 depicts an illustrative frequency matrix. The depicted Frequency Matrix is related to the input text depicted in FIG. 2. Please note that only a subset of tokens is provided for illustrative purposes.

Figure 4:
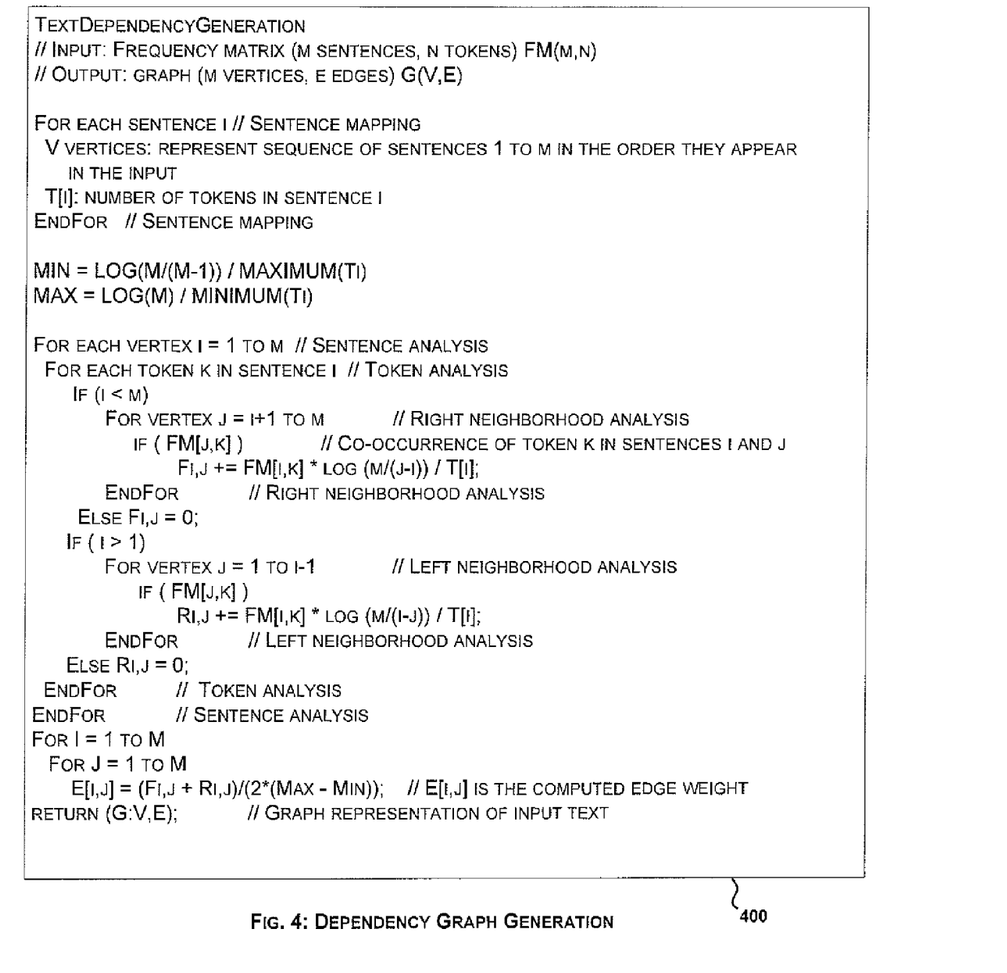
FIG. 4 provides an algorithm for dependency graph generation.

FIG. 4 provides an algorithm for dependency graph generation. Graphically, each sentence is represented by a node. The weights on directed edges between the nodes indicate the degree of coherence between the corresponding sentences. These values are derived from the frequency matrix m X n, where m is the number of sentences and n is the number of tokens or filtered words in the given text. Given m sentences, there could be at most (m−1) boundaries. These are initially referred to as candidate boundaries. We assess the strengths of these boundaries B1, B2, . . . Bm−1 by means of linking succeeding sentences with similar tokens. This is based on neighborhood effect and is defined based on $FM(k)*\log(M/Dj))/Ti$ wherein $FM(k)$ is the frequency of token k in a sentence, M is the total number of sentences, Dj is the distance to similar token in a subsequent sentence, and Ti is the number of tokens in the sentence. The intuition behind the above formulation is that similar tokens present in neighboring sentences should be given higher weightage than those in sentences that are far apart. This is achieved by incorporating the distance based on the sequence of a sentence in the text. In the above approach, the distance measured by linking forward needs to be unidirectional; otherwise the effect would be reduced. Reverse linking is considered separately, by replacing Dj with the distance to a preceding sentence with the token. Typically, sentences containing anaphoric references are assigned higher weighted links to preceding sentences with the entities, while those with cataphoric references are assigned higher weighted links to the succeeding sentences. Hence, directions are important in distinguishing the segments. The final weight of an edge is computed based on these two forward and reverse linkings.

The details of dependency graph generation are given below (400).

Figure 5:
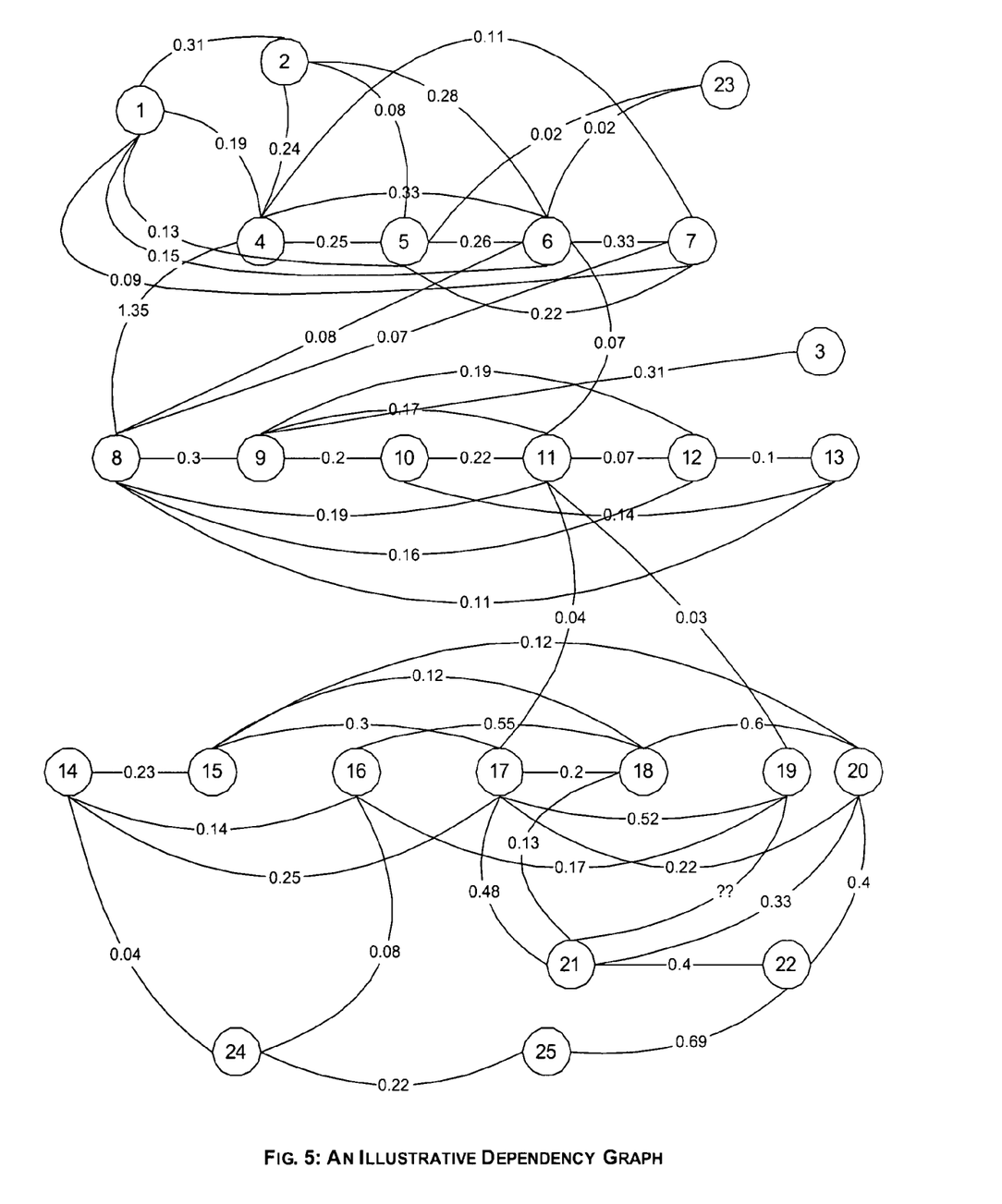
FIG. 5 depicts an illustrative dependency graph
FIG. 6 provides an algorithm for cohesiveness based graph segmentation.

TextDependencyGeneration
// Input: Frequency matrix (M sentences, N tokens) FM(M,N)
// Output: graph (M vertices, E edges) G(V,E)
For each sentence i // Sentence mapping
   V vertices: represent sequence of sentences 1 to M in the order they appear in the input
   T[I]: number of tokens in sentence i
EndFor // Sentence mapping
MIN =LOG(M/(M−1)) / MAXIMUM(T[I])
MAX =LOG(M) / MINIMUM(T[I])
For each vertex I =1 to M // Sentence analysis
For each token K in sentence I // Token analysis
   If (I <M)
     For vertex J =I+1 to M // Right neighborhood analysis
       if (FM[J,K]) // Co-occurrence of token k in sentences i and j
         FI,J +=FM[J,K] * Log (M/(J−I)) / T[I];
     EndFor // Right neighborhood analysis
   Else FI,J =0;
   If (I>1)
     For vertex J =1 to I−1// Left neighborhood analysis
       if (FM[J,K])
         RI,J +=FM[J,K] * Log (M/(I−J)) / T[I];
     EndFor // Left neighborhood analysis
   Else RI,J =0;
EndFor // Token analysis
EndFor // Sentence analysis
For I =1 to M
   For J =1 to M
     E[I,J] =(FI,J +RI,J)/(2*(MAX −MIN)); // E[I,J] is the computed edge weight return (G:V,E); // Graph representation of input text FIG. 5 depicts an illustrative dependency graph for the input text depicted in FIG. 2. Observe that the edge weights are normalized and almost the set of sentences of the input text appear as a single connected graph.

Figure 6:
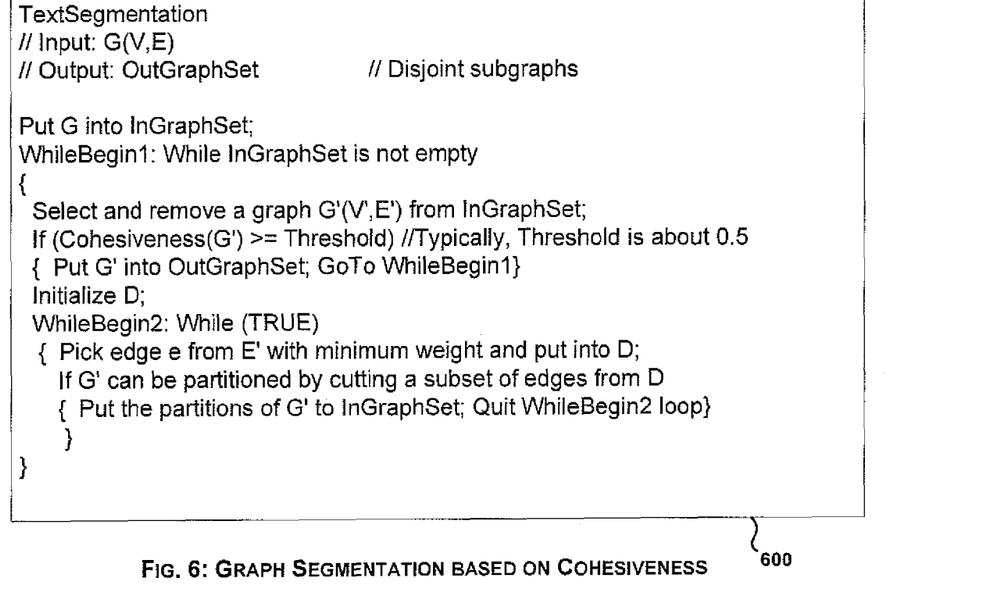

FIG. 6 provides an algorithm for cohesiveness based graph segmentation. In order to identify segment boundaries, it is required to cut the single connected graph so that multiple segments present in the input text can be determined. The graph segmentation leads directly to input text segmentation as each node in the graph represents an input sentence. While edge weights of a graph play a role in the segmentation process, it is required to assess the cohesiveness of the sentences represented by the graph in order to take a decision whether the graph needs to be further segmented or not. Successive segmentation of the graph leads to smaller and smaller subgraphs, and finally, the sentences represented by each subgraph that remains forms a cohesive text segment.

The details of the cohesiveness based graph segmentation are provided below (600).

TextSegmentation
// Input: G(V,E)
// Output: OutGraphSet // Disjoint subgraphs
Put G into InGraphSet;
WhileBegin1: While InGraphSet is not empty
{
   Select and remove a graph G'(V',E') from InGraphSet;
   If (Cohesiveness(G') >=Threshold) //Typically, Threshold is about 0.5
   { Put G' into OutGraphSet; GoTo WhileBegin1}
   Initialize D;
   WhileBegin2: While (TRUE)
   { Pick edge e from E' with minimum weight and put into D;
     If G' can be partitioned by cutting a subset of edges from D
     { Put the partitions of G' to InGraphSet; Quit WhileBegin2 loop}
   }
}

Figure 6A:
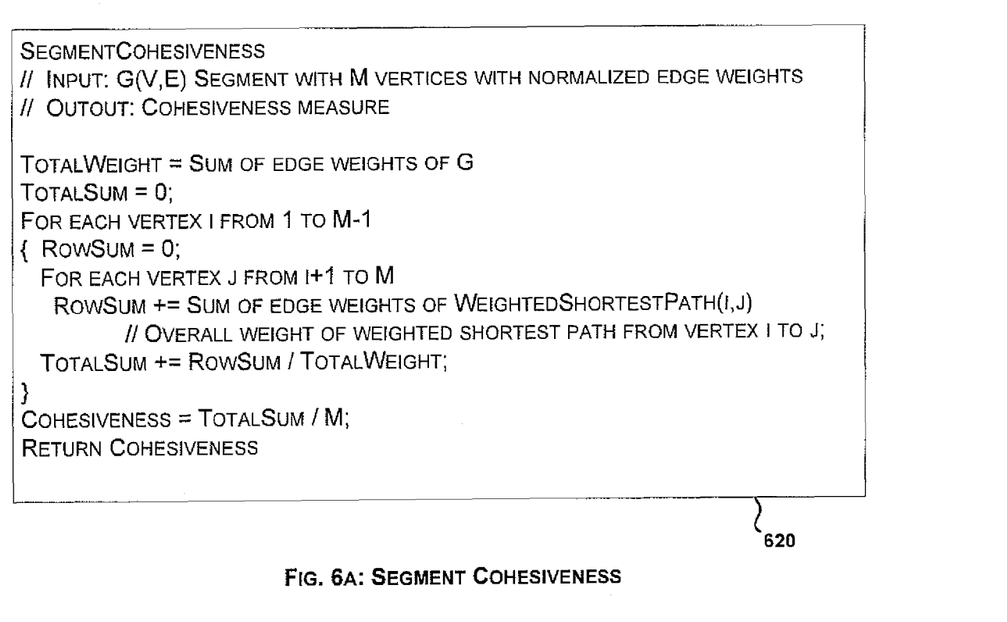
FIG. 6a provides an algorithm for segment cohesiveness analysis.

FIG. 6a provides an algorithm for segment cohesiveness analysis. The assessment of cohesiveness of a graph is based on the notion of the extent of support each sentence of represented by a node of the graph provides for the rest of the sentences represented by the graph. This support is computed based on the shortest path between two nodes in the graph and the edge weights of this shortest path. And, the cohesiveness is computed based on the normalized pair-wise overall weight of the shortest weighted path across all of the nodes of the graph.

The details of segment cohesiveness analysis are provided below (620).

Figure 6B:
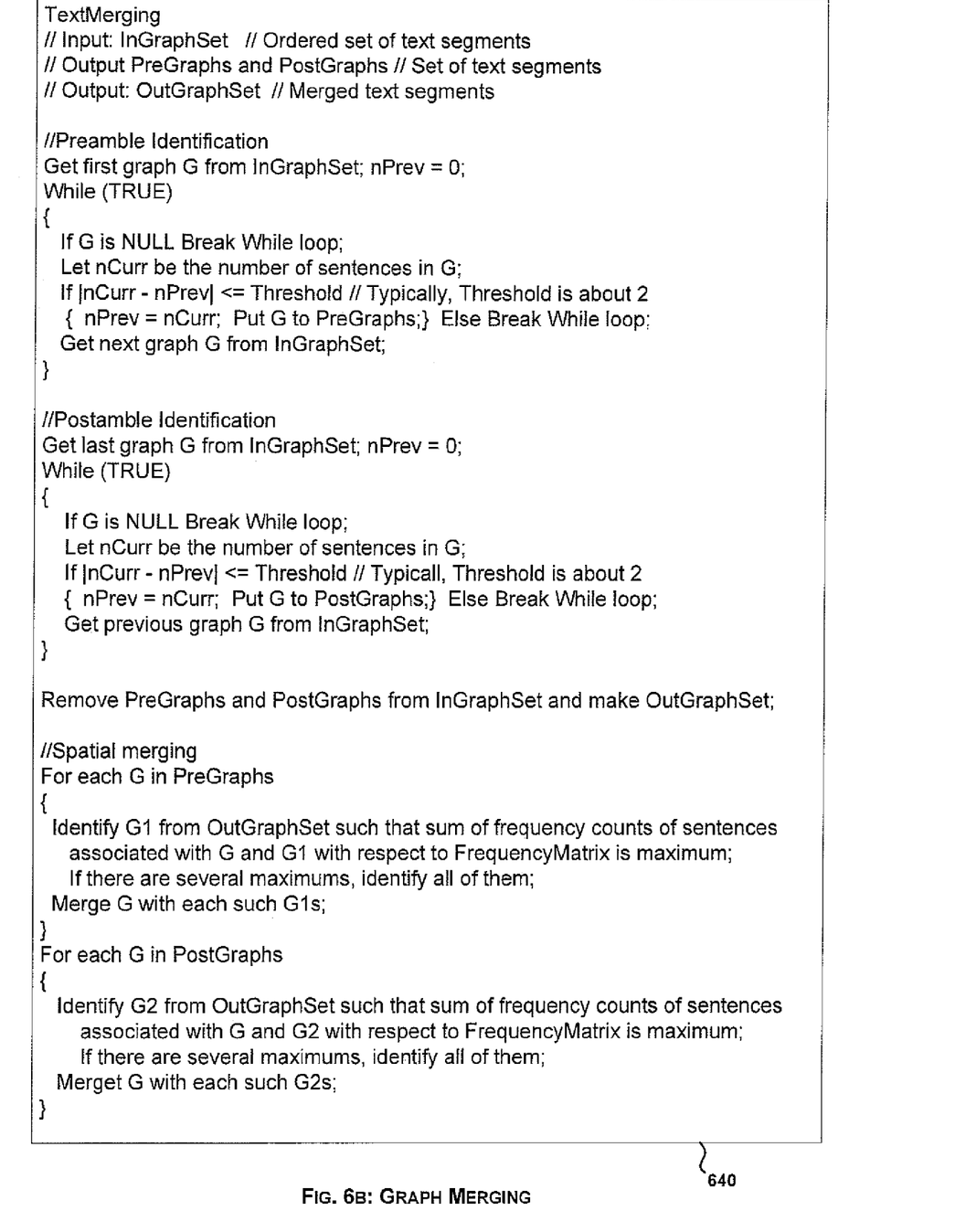
FIG. 6b provides an algorithm for segment grouping.

SegmentCohesiveness
// Input: G(V,E) Segment with M vertices with normalized edge weights
// Outout: Cohesiveness measure
TotalWeight =Sum of edge weights of G
TotalSum =0;
For each vertex I from 1 to M−1
{ RowSum =0;
   For each vertex J from I+1 to M
     RowSum +=Sum of edge weights of WeightedShortestPath(I,J)
     // Overall weight of weighted shortest path from vertex I to J;
   TotalSum +=RowSum / TotalWeight;
}
Cohesiveness =TotalSum / M;
Return Cohesiveness FIG. 6b provides an algorithm for segment grouping. The need for segment grouping is on account of the observation that there are intersegment relationships that are not based on segmental neighborhood properties. A distinct kind of segment grouping that has practical applications is based on identifying the three portions in the text input: Preamble Text Segments (also called as header segments), Body Text Segments (also called as main segments), and Postamble Text Segments (also called as footer segments): associate a preamble segment with one or more body segments; and similarly, associate a postamble segment with one or more body segments. With reference to FIG. 6b, preamble identification is based on the observation that the successive segments in the preamble segment are of similar size (that is, number of sentences in a segment) and differ drastically with respect to the segments in the body. A similar distinction remains between postamble segments and body segments as described in FIG. 6b. FIG. 6b also describes spatial merging in which a preamble or postamble segment is merged with one or more body segments based on the term co-occurrence between two segments under consideration. Note that as this spatial merging is a special case of general segment merges, an underlying assumption is that a preamble or postamble segment gets merged with at least one body segment.

The details of segment grouping are provided below (640).
TextMerging
// Input: InGraphSet // Ordered set of text segments
// Output PreGraphs and PostGraphs // Set of text segments
// Output: OutGraphSet // Merged text segments
//Preamble Identification
Get first graph G from InGraphSet; nPrev =0;
While (TRUE)
{
   If G is NULL Break While loop;
   Let nCurr be the number of sentences in G;
   If InCurr −nPrevl <=Threshold // Typically, Threshold is about 2
     { nPrev =nCurr; Put G to PreGraphs;} Else Break While loop;
   Get next graph G from InGraphSet;
}
//Postamble Identification
Get last graph G from InGraphSet; nPrev =0;
While (TRUE)
{
   If G is NULL Break While loop;
   Let nCurr be the number of sentences in G;
   If InCurr −nPrevl <=Threshold // Typically, Threshold is about 2
     { nPrev =nCurr; Put G to PostGraphs;} Else Break While loop;
   Get previous graph G from InGraphSet;
}
Remove PreGraphs and PostGraphs from InGraphSet and make OutGraphSet;
//Spatial merging
For each G in PreGraphs
{
   Identify G1 from OutGraphSet such that sum of frequency counts of sentences associated with G and G1 with respect to FrequencyMatrix is maximum;
     If there are several maximums, identify all of them;
   Merge G with each such G1s;
}
For each G in PostGraphs
{
   Identify G2 from OutGraphSet such that sum of frequency counts of sentences associated with G and G2 with respect to FrequencyMatrix is maximum;
     If there are several maximums, identify all of them;
   Merge G with each such G2s;
}

Figure 7:
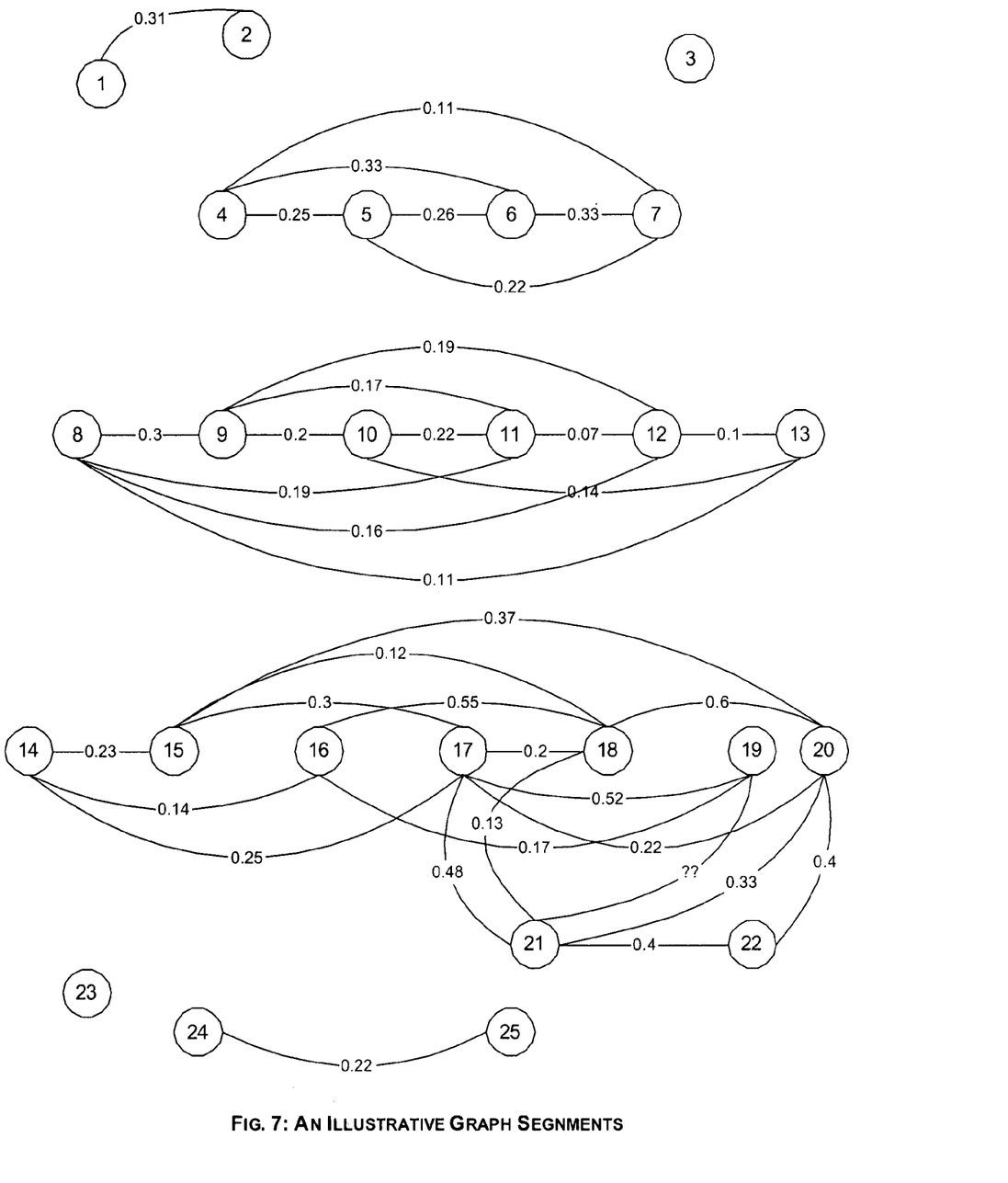
FIG. 7 depicts an illustrative graph segments.

FIG. 7 depicts an illustrative graph segments. Observe how the header, main, and footer segments stand out after the process of segmentation. One of the header segments involves sentences 1 and 2. And, sentences 8 through 13 form a main segment.

FIG. 8 depicts an illustrative text segments. In the illustration, header, main, and footer segments are also indicated.

FIG. 9 depicts an illustrative merged text segments. Note that a header segment, Segment H1, is merged with a main segment, Segment A. Similarly, Segment H2 is merged with Segment B, Segment F1 is merged with Segment A, and Segment F2 is merged with Segment C.

Thus, a system and method for text based analysis of automated speech recognizer transcripts is disclosed. Although the present invention has been described particularly with reference to the figures, it will be apparent to one of ordinary skill in the art that the present invention may appear in any number of systems that perform textual analysis for segmentation and segment merging. It is further contemplated that many changes and modifications may be made by one of ordinary skill in the art without departing from the spirit and scope of the present invention.

What is claimed is:

1. A text segmentation system, for segmenting of a plurality of sentences represented using a dependency graph into a plurality of out graphs, wherein said dependency graph comprises of a plurality of vertexes and a plurality of edges, with each vertex of said plurality of vertexes is associated with a sentence of said plurality of sentences, and said system comprises:
   means for constructing said dependency graph based on said plurality of sentences;
   means for segmenting said dependency graph to result in a plurality of ordered out graphs; and
   means for grouping said plurality of ordered out graphs to result in said plurality of out graphs.

2. The system of claim 1, wherein said means for constructing further comprises:
   means for determining a plurality of tokens of said plurality of sentences;
   means for computing a plurality of frequency counts based on said plurality of tokens and said plurality of sentences;
   means for computing a plurality of forward linkings based on said plurality of frequency counts;
   means for computing a plurality of reverse linkings based on said plurality of frequency counts; and
   means for computing a plurality of edge weights of said plurality of edges of said dependency graph based on said plurality of forward linkings and said plurality of reverse linkings, wherein an edge weight of said plurality of edge weights is associated with an edge of said plurality of edges connecting a vertex I of said plurality of vertexes and a vertex J of said plurality of vertexes.

3. The system of claim 2, wherein said means for computing a forward linking of said plurality of forward linkings further comprises:
   means for obtaining a sentence of said plurality of sentences;
   means for obtaining a token of said plurality of tokens, wherein said token is a part of said sentence;
   means for associating a vertex I of said dependency graph with said sentence;
   means for determining a vertex J wherein a sentence J associated with said vertex J is to the right of said sentence based on said plurality of sentences and said token is a part of said sentence J; and
   means for computing said forward linking based on said forward linking, said plurality of frequency counts, said sentence J, and said token, wherein said forward linking is associated with said vertex I and said vertex J.

4. The system of claim 2, wherein said means for computing a reverse linking of said plurality of reverse linkings further comprises:
   means for obtaining a sentence of said plurality of sentences;
   means for obtaining a token of said plurality of tokens, wherein said token is a part of said sentence;
   means for associating a vertex I of said dependency graph with said sentence;

means for determining a vertex J wherein a sentence J associated with said vertex J is to the left of said sentence based on said plurality of sentences and said token is a part of said sentence J; and means for computing said reverse linking based on said reverse linking, said plurality of frequency counts, said sentence J, and said token, wherein said reverse linking is associated with said vertex I and said vertex j.

5. The system of claim 2, wherein said means for computing an edge weight of said plurality of edge weights further comprises:
means for obtaining a vertex I of said plurality of vertexes of said dependency graph;
means for obtaining a vertex J of said plurality of vertexes of said dependency graph;
means for determining a forward linking of said plurality of forward linkings, wherein said forward linking is associated with said vertex I and said vertex J;
means for determining a reverse linking of said plurality of reverse linkings, wherein said reverse linking is associated with said vertex I and said vertex J; and
means for determining said edge weight based on said forward linking and said reverse linking, wherein said edge weight is associated with an edge of said plurality of edges connecting said vertex I and said vertex J.

6. The system of claim 1, wherein said means for segmenting further comprises:
means for computing a cohesiveness of said dependency graph, wherein said cohesiveness is greater than or equal to a pre-defined threshold; and
means for making said dependency graph a part of said plurality of ordered out graphs.

7. The system of claim 6, wherein said means further comprises:
means for determining an edge of said plurality of edges with an edge weight of said plurality of edge weights, wherein said edge weight is the minimum with respect to said plurality of edge weights;
means for making said edge weight a part of a plurality of minimum edge weights;
means for making said edge a part of a plurality of minimum edges;
means for partitioning said dependency graph based on said plurality of minimum edges resulting in a plurality of in graphs;
means for obtaining an in graph of said plurality of in graphs;
means for computing a cohesiveness of said in graph, wherein said cohesiveness is greater than or equal to a pre-defined threshold; and
means for making said in graph a part of said plurality of ordered out graphs.

8. The system of claim 6, wherein said means for computing said cohesiveness of said dependency graph further comprises:
means for computing a total weight based on said plurality of edge weights;
means for determining a vertex I of said plurality of vertexes;
means for determining a vertex J of said plurality of vertexes;
means for determining a plurality of shortest edges of said plurality of edges, wherein each of said plurality of shortest edges is part of an edge of a shortest path from said vertex I to said vertex J;
means for computing a row sum of a plurality of row sums based on said plurality of shortest edges;
means for computing a total sum of a plurality of total sums based on said plurality of row sums and said total weight; and means for computing said cohesiveness based on said plurality of total sums and said plurality of vertexes.

9. The system of claim 1, wherein said means for grouping said plurality of ordered out graphs further comprises:
means for computing a plurality of preamble graphs based on said plurality of ordered out graphs;
means for computing a plurality of postamble graphs based on said plurality of ordered out graphs;
means for making said plurality of ordered out graphs as said plurality of out graphs;
means for removing said plurality of preamble graphs from said plurality of out graphs;
means for removing said plurality of postamble graphs from said plurality of out graphs;
means for obtaining a preamble graph of said plurality of preamble graphs;
means for determining a graph 1 from said plurality of out graphs based on said preamble graph and said plurality of frequency counts;
means for merging said preamble graph with said graph 1;
means for obtaining a postamble graph of said plurality of postamble graphs;
means for determining a graph 2 from said plurality of out graphs based on said postamble graph and said plurality of frequency counts; and
means for merging said postamble graph with said graph 2.

10. The system of claim 9, wherein said means further comprises:
means for determining a first graph of said plurality of ordered out graphs, wherein said first graph is the first graph based on said plurality of ordered out graphs;
means for making said first graph a part of said plurality of preamble graphs, wherein the number of sentences associated with said first graph is less than or equal to a pre-defined threshold;
means for determining a last graph of said plurality of preamble graphs, wherein said last graph is the last graph based on said plurality of preamble graphs;
means for determining a next graph of said plurality of ordered out graphs, wherein said next graph based on said last graph; and
means for making said next graph a part of said plurality of preamble graphs based on the number of sentences associated with said last graph, the number of sentence associated with said next graph, and a pre-defined threshold.

11. The system of claim 9, wherein said means further comprises:
means for determining a last graph of said plurality of ordered out graphs, wherein said last graph is the last graph based on said plurality of ordered out graphs;
means for making said last graph a part of said plurality of postamble graphs, wherein the number of sentences associated with said last graph is less than or equal to a pre-defined threshold;
means for determining a first graph of said plurality of postamble graphs, wherein said first graph is the first graph based on said plurality of postamble graphs;
means for determining a previous graph of said plurality of ordered out graphs, wherein said previous graph based on said first graph; and
means for making said previous graph a part of said plurality of postamble graphs based on the number of sentences associated with said first graph, the number of sentence associated with said previous graph, and a pre-defined threshold.

* * * * *